May 13, 1941.  Z. J. ATLEE  2,242,101
METHOD OF CONDITIONING X-RAY GENERATORS
Filed Nov. 25, 1940
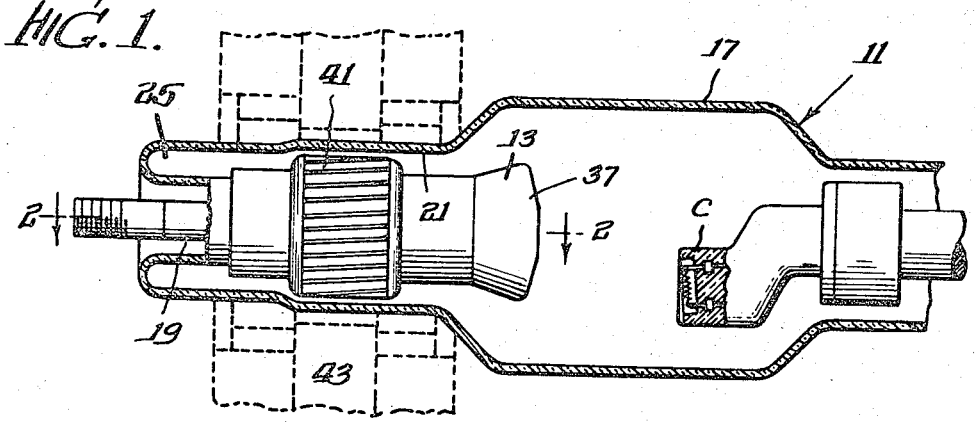
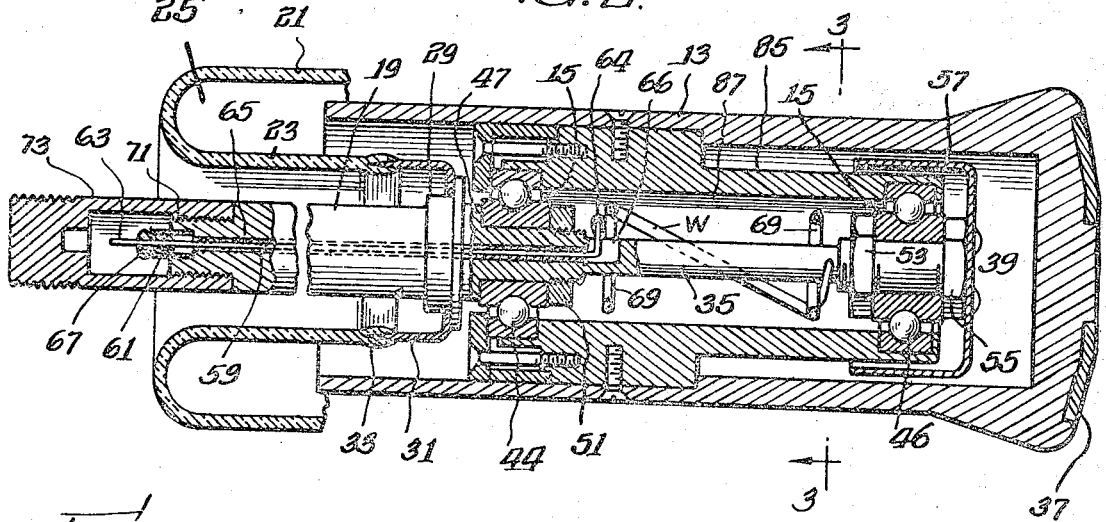
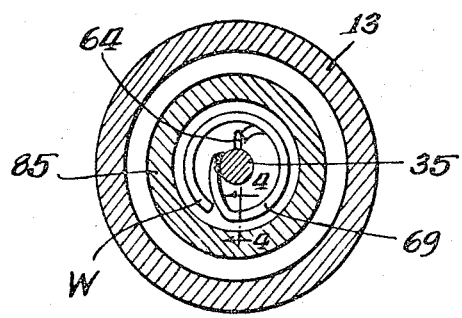
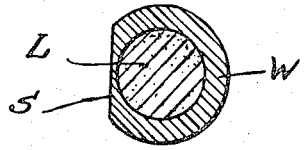
INVENTOR.
Zed J. Atlee
BY Spencer, Marzall, Johnston & Cook
ATTORNEYS Patented May 13, 1941

2,242,101

UNITED STATES PATENT OFFICE 2,242,101

METHOD OF CONDITIONING X-RAY GENERATORS

Zed J. Atlee, Elmhurst, Ill., assignor to General Electric X-Ray Corporation, Chicago, Ill., a corporation of New York Application November 25, 1940, Serial No. 366,978

14 Claims. (Cl. 250—148)

My invention relates in general to anti-friction devices, and has more particular reference to bearings, especially bearings for service under vacuum conditions.

The present application is a continuation in part of my co-pending application, Serial No. 284,273, filed July 13, 1939.

An important object of the invention is to provide means for processing a bearing in order, in a sense, to lubricate the same without using a lubricant having a vapor pressure such as to cause evaporation of the lubricating medium and migration thereof from the bearing under the temperature conditions to which the bearing is subjected when in operation.

Another important object resides in providing a new method of insuring that a bearing, operating under low pressure or vacuum conditions, shall retain its anti-friction qualities without resort to lubrication as presently applied in bearings, the invention having as a further important object the provision of a method of processing anti-friction devices of the character mentioned with a medium which has a vapor pressure sufficiently low so that it will not evaporate from the bearing and thus destroy the vacuum condition; a further object being to utilize, as a lubricating medium, a material such as barium, calcium, strontium, magnesium, chromium, copper, gold, silver, zinc, lead, aluminum, gallium, iron, nickel, cobalt, zirconium, rhodium or manganese, having a vapor pressure of the order of $10^{-9}$ mm. of mercury at atmospheric pressure and not to exceed $10^{-6}$ mm. of mercury at high temperatures of the order of 200° centigrade, whereby the lubricating medium may not migrate from a treated bearing operating under low pressure and high temperature conditions.

Another important object resides in processing a bearing particularly for use in X-ray generators to support a rotating element of the generator for operation within a sealed evacuated enclosure in which the operating temperature at the processed bearing may reach the order of 200° centigrade and up.

Another important object resides in the provision of means for applying the lubricating medium to the bearing after the same has been sealed within the evacuated enclosure.

Another important object resides in applying a lubricating medium of the character mentioned by flashing the same as a vapor upon the bearing surfaces to be treated, and causing the vapor to condense upon said surfaces to form a film of relatively soft material having lubricating qualities but which will not migrate from the treated surfaces even under conditions of high temperature and low pressure through the mechanical cohesion of the filmed material and its low vapor pressure.

Another important object resides in applying the material as a film on the surfaces to be treated by providing a supply of said material in position adjacent such surfaces, then evaporating or flashing the material, by heating the same, to produce vapor, and directing the vapor toward and upon the surfaces to be treated; a further object being to arrange the supply of material in a capsule or casing, preferably in the form of a hollow filamentary wire having a weakened wall portion through which the vaporized material may be expelled, the casing or capsule being mounted with its weakened wall facing toward the surfaces to be treated; a further object being to utilize an electrical current flowing in said filamentary wire capsule for the purpose of vaporizing the material.

Another important object is to provide means for delivering electrical current for flashing the material to a supply of the material sealed within an evacuated chamber.

A further object is to provide an X-ray generator including a bearing enclosed in the sealed evacuated envelope of the generator, and in utilizing the stem on which the bearing is mounted as a circuit forming part for the delivery of current to a supply of vaporizable material within the envelope.

These and numerous other important objects, advantages, and inherent functions of the invention will become apparent as the same is more fully understood from the following description, which, taken in connection with the accompanying drawing, discloses a preferred embodiment of the invention.

Referring to the drawing,

Figure 1 is a sectional view taken through an X-ray generator provided with a rotating anode supported by a bearing structure of a type adapted for treatment in accordance with my present invention;

Figure 2 is an enlarged sectional view taken substantially along the line 2—2 in Figure 1, illustrating one mode of applying my present invention;

Figure 3 is a sectional view taken substantially along the line 3—3 in Figure 2; and Figure 4 is an enlarged view taken substantially along the line 4—4 in Figure 3.

To illustrate my invention I have shown on the drawings an X-ray generator 11 comprising a rotating anode 13 supported within a sealed envelope 17 on bearings 15, although it will be apparent, as the description proceeds, that my invention is not necessarily limited to X-ray generators or even necessarily to bearings for operation under conditions of high temperature and low pressure. Nevertheless, my invention has great value in providing improved bearing means having unusually fine operating characteristics at high temperature and low pressure, and so I have chosen to demonstrate my invention as applied in X-ray generators, in the operation of which such excessive conditions of high heat and low pressure are encountered.

The generator shown, of course, includes a cathode C of any usual or preferred character, and the anode is supported by the bearing 15 on a spindle 19, which is shown mounted on and supported by the envelope 17 at one end thereof. As shown, the envelope has an extension 21, within which the anode 13 is snugly disposed for rotation, the envelope having a reentrant sleeve-like portion 23 forming an annular space 25 between the envelope extension 21 and the reentrant portion 23.

The spindle 19 has an outwardly extending portion which is provided with means 29 forming an annular shoulder carrying an annular flanged member 31 sealed thereon. The member 31 has a peripheral edge forming a glass-to-metal seal 33 with the inner end of the reentrant envelope portion 23. This seal, through the member 31, supports the spindle on the envelope with a spindle portion 35 extending within the envelope, the anode bearings 15 being mounted on said inwardly extending spindle portion 35.

It should be understood that X-ray generators function to produce X-rays in response to the activation of the anode by electronic action established by the operation of the cathode 13. This electronic action comprises the impingement of electrons emitted by the cathode upon a target 37 forming a part of the anode, and such electronic impingement results in the generation of relatively large quantities of heat, which is dissipated thence through the body of the anode 13, and also into the interior of the casing 17. When in operation, the temperature of the X-ray generator and particularly of the anode may be of the order of 500° centigrade.

In conditioning an X-ray generator for operation, the envelope 17 is treated to remove all gaseous and other impurities, the same being accomplished by evacuating the envelope as by means of a molecular exhaust pump while heating the elements of the generator to a high temperature in order to drive out gases occluded in the envelope and all of the elements contained therein. The envelope finally is sealed after all impurities have been thus eliminated.

During the operation of the X-ray generator as such, the anode 13 is desirably rotated at high speed, in order to minimize the danger of overheating and burning the target itself, as a result of electron impact. Considerable difficulty has been encountered in providing means for supporting the anode for rotation during the life of the generator, under the excessively high temperature conditions and the low pressure necessarily maintained within the envelope 17, since it is not feasible to apply usual bearing lubrication because lubricants of the character heretofore known will not remain in the bearings under the low pressure condition necessarily maintained in the envelope, but will instantly evaporate and become dissipated within the envelope, thus not only robbing the bearings of lubricant but also destroying the vacuum in the tube and rendering the same inoperative. Consequently, it has not heretofore been considered feasible to lubricate bearings under conditions necessarily maintained in X-ray generators. Excessive bearing wear results, particularly at the high temperatures encountered in the generator, with the resultant development of anode vibration, which rapidly renders the device unusable. Excessive bearing wear also results in the production of minute wear products, which also impair the operation of the generator as the same become dissipated from the bearings within the envelope.

My present invention relates to a method of lubricating bearings in a manner avoiding the aforesaid difficulties, particularly encountered in X-ray generators having rotating anodes; but the invention is by no means limited to such particular apparatus and, in fact, may be applied to advantage in any bearing structure.

In practicing my invention, I select a suitable material adapted to be applied as a vapor and to condense and form a film upon the bearing surfaces to be treated, the selected material desirably having several qualities, including not only softness and flowability, with low internal coefficient of friction when in film-like form, but also sufficient mechanical cohesion to cause the filmed material to be retained upon the treated bearing surfaces, the property of "wetting" the bearing surfaces to be treated, low vapor pressure to prevent evaporation at the pressures and temperatures to which the treated bearing is to be exposed, and, unless the bearing is to be in operation in an oxygen-free atmosphere, the lubricating material should not normally oxidize. Where the bearing is applied in an evacuated X-ray generator, the problem of oxidation of the filmed lubricating medium will not, of course, be encountered. However, if the treated bearing is for use in the ordinary atmosphere, or elsewhere exposed to oxidation, the lubricating medium should be of a character normally resisting oxidation.

I have found that barium, calcium, strontium, magnesium, chromium, copper, gold, silver, aluminum, gallium, iron, cobalt, zirconium, rhodium, manganese and nickel are all of a nature adapted for use as lubricating media, in accordance with the teachings of my present invention; that combinations of these materials may be used; and, in fact, in treating bearings for use in X-ray generators, I prefer to employ barium, as a lubricating film applied upon the bearing surfaces. The foregoing materials have vapor pressures of the order of $10^{-6}$ at temperatures of the order of 200° centigrade and are therefore well adapted for use as lubricants in bearings operating under low pressure conditions. Where operating pressures are relatively higher, other metals such as caesium, rubidium, sodium, lithium and potassium are available in addition to those specified for excessively low pressure service.

Chromium, which normally will not oxidize, may be used in the treatment of bearings for operation in atmosphere or under other oxidizing conditions.

The selected material is applied upon the bearing surfaces, in accordance with my present invention, by vaporizing the same and directing a stream of the vaporized material upon the bearing surfaces to be treated whereby thus to condense the vapor and form a thin film of the material upon the surfaces to be treated. Vaporization and delivery of the material upon the surfaces may be accomplished in any suitable or preferred manner. A supply of the material, for example, may be positioned in a capsule or container having an opening facing the surfaces to be treated, and the material then heated in the capsule in any convenient manner, as by the passage of an electrical current in order to vaporize the material within the capsule and blowing the resulting vapor through the capsule opening and upon the surfaces to be processed. Alternately, the material may be formed as a filamentary wire, in which the desired lubricating element is incorporated, and then passing an electrical current through the wire in order to expel the lubricating medium as a vapor upon the surfaces to be treated. Such wires as theriated tungsten and alloys of silver and zinc may be utilized in this manner. Heating coils of tungsten wire in pocket shape, with a small quantity of the lubricating medium enclosed in the pocket, may similarly be used. As the tungsten wire is heated to the melting point of the metal so enclosed, an alloy of the lubricating medium with the tungsten wire may be formed on the surfaces of the wire, and this alloy in turn may then be re-evaporated in order to produce a film of the lubricating medium upon the surfaces to be treated.

This method is suitable for applying such materials as chromium, difficultly obtainable in metallic state and possessing high melting point.

I prefer, however, in treating bearings for use in X-ray generators, to employ a hollow filamentary wire W, preferably of iron or nickel, containing within the wire a quantity of the lubricating material L, such as pure barium, the hollow wire being weakened by reducing its wall thickness along one side of the wire, as indicated at S. By passing an electrical current through the wire W, the material L may be vaporized therein, the vapor products being blown out through the weakened wall section S, and of course by supporting the wire with the surface S facing toward the bearing surfaces to be treated, the vaporized medium may be directed directly upon such bearing surfaces.

As shown in the drawings, the anode 13 comprises a cylindrical body having an open end extending in the annular envelope space 25 in position to encircle the seal 33 at the inner end of the reentrant envelope portion 23. The anode thus forms a shield for protecting the seal 33 from deterioration through impingement of stray electrons thereon. The opposite end of the anode body is enclosed, as at 39, and affords a mounting for the target 37. Externally the cylindrical walls of the anode form a seat on which is secured the rotor 41 of an electric motor, the stator 43 of which encircles the envelope extension 21 in cooperative relationship with the rotor 41 whereby to drive the anode within the envelope when the stator 43 is excited from any suitable source of electrical power externally of the envelope.

The spindle 35 extends within the cylindrical anode and carries the bearing means 15, said bearing means comprising in the illustrated embodiment a pair of roller bearings 44 and 46, in spaced-apart position on the spindle portion 35. Each bearing comprises an outer race secured on the anode, and an inner race secured on the spindle portion 35, roller members of any suitable or convenient form, and illustrated as balls, being conventionally retained between the inner and outer race portions.

The anode 13 may, of course, be mounted on the bearing elements in any suitable or preferred fashion, although I have shown the same in the drawing clampingly secured on a cylindrical sleeve-like anode mounting element 85, upon which the cylindrical anode member 13 is fastened, the bearings being enclosed within the hollow bore 87 of the member 85.

The spindle portion 35 is formed with a shoulder 47 providing a seat for the inner race of the bearing 44, the bearing being clamped in said seat and held in position on the stem preferably by means of a nut 51 threaded on the stem. The stem 35 is also threaded to receive clamping nuts 53 and 55 between which is clampingly secured on the stem the inner race of the bearing 46, and a heat shield 57 may be provided for the bearing 46 and supported on the clamping nut 55 in position extending between the target-carrying end of the anode, in which maximum heat is encountered during the operation of the device. This shield serves to protect the bearing from heat radiated from said target-carrying portions of the anode, and tends to equalize the temperature under which the bearings 44 and 46 function.

The spindle 19 is provided with a longitudinally extending duct 59 extending from the outwardly exposed end of the spindle to a point in the spindle portion 35 intermediate the bearings 44 and 46, said duct 59 opening laterally on the portion 35 within the bore or channel 87 of the anode support element 85. The outer end of the duct 57 is enlarged, and has sealed therein a sleeve 61, preferably comprising forty-two percent nickel steel, a material adapted to seal readily with glass.

A lead conductor 63 is arranged in the duct 59 with one end of said conductor extending outwardly of the sleeve 61, and the other end projecting through the end of the duct which opens on the spindle portion 35. Suitable insulating means 65, such as a sleeve of magnesium silicate, or a plurality of glass beads embracing the conductor within the duct 59, is provided for insulating the conductor electrically from the stem 19 in which it is arranged, the outer end of the duct being sealed preferably by means of a glass globule 67 applied within the sleeve 61 around the conductor 63.

Within the space 87 I mount suitable support means for a supply of the lubricating material L, and utilize the conductor 63 and the spindle 19 as circuit forming means for electrically energizing the material L to vaporize the same within the channel 87, in order to process the bearings 15. In the illustrated embodiment this is accomplished by arranging a length of the filamentary tubular wire W on the stem portion 35, said wire being arranged to form loops 69 in position opposite the bearings 15, with the weakened surfaces of the wire portions forming said loops 69 facing toward the bearings. The loops 69 are electrically interconnected, preferably in series, in any suitable fashion by means of an integral portion of the wire W extending between the loops 69. One of the loops is electrically connected as by soldering or welding the same upon the spindle portion 35, the other loop being electrically connected with the end of the conductor 63 which is exposed within the channel 87. If desired, the spindle 35 may be provided with insulating means for supporting the wire W rigidly in position, although ordinarily additional support is not required since the wire itself has sufficient rigidity to maintain itself in assembled position, at least until after the material L has been flashed in processing the bearing.

It will be seen from the foregoing that by connecting a suitable source of electrical potential between the outwardly exposed end of the conductor 63 and the spindle 19, an electrical heating current may be caused to flow through the wire W in order to raise the temperature of the wire to a point at which the material L vaporizes, in order thus, as heretofore described, to cause the expulsion of vapor through the weakened wall S at the loops 69 and thence upon the bearings.

The bearings preferably are thus processed for the application of a film of the lubricating medium L thereon, after assembly in the envelope 17 and after the envelope has been evacuated, as heretofore described, so that flashing of the material L is accomplished substantially in vacuo and after the envelope 17 has been completely sealed. The flash products, however, will not escape to any detectable extent from the hollow anode. The vaporized products, however, impinging upon the facing surfaces of the bearings, which preferably are rotated during the flashing of the material L, immediately condense upon the surfaces to form a film thereon, the inner face of the film wetting the surface material of the bearing and forming an alloy therewith which holds the film in place. The rotation of the bearings causes substantially all of the surfaces thereof required to be treated to receive the coated film of the lubricating material; and since the flash products are confined substantially within the chamber 87, no migration of such products outwardly of the bearings and the hollow anode is detectable, and the vacuum condition within the envelope is not in any way impaired as a result of the flashing operation.

In order to seal and protect the exposed end of the conductor 63, the outer end of the stem 19 may be threaded, as shown at 71, to receive a cover cap 73, the outer end of which may be threaded as shown, or otherwise finished as desired, said cap being preferably threaded for the reception of heat dissipating means thereon by means of which heat developed at the anode may, in part, be dissipated from the generator by conduction through the anode support sleeve 85, the bearings 15, and the spindle outwardly of the envelope 17.

The flashing of the material L from the wire W may be controlled so that the lubricating medium L may be repeatedly flashed on the bearing surfaces. This may be accomplished in any suitable manner, for example, by controlling the amount of heating current and the time of flow through the wire W. In this manner, the lubrication of the bearings can be renewed from time to time in a very simple manner.

It has been found that the best results are obtained where there is apparently the formation of an alloy. This may be accomplished by vaporizing on the working surface of the bearing in succession two or more thin films of a metallic lubricating medium, or by forming the bearing itself of a type of material which forms an alloy with the metallic vapor that is flashed on the bearing surface. In general, this latter method is preferred, because the lubricating alloy is an integral part of the working surface of the bearing. It will be understood that the working surface of the bearing may be such that the first vaporized thin metallic coating applied will alloy therewith and the second vaporized thin metallic coating will alloy with the first. The life of the lubrication is not as long if neither of the metallic coatings has an alloying action with the metal or metals from which the working surface of the bearing is made.

Excellent results have been obtained when the working surface of the bearing has been formed of a high speed tungsten-cobalt steel, such as Circle C (Firth Sterling Company), this alloy comprising about 18% tungsten, about 9% cobalt, about 4.5% chromium, about 1.75% vanadium, about 1% molybdenum, and 0.77% carbon, the remainder being substantially all iron. Among the metals which have been applied as a vapor to this type of bearing are the following: Barium, zinc, magnesium, strontium, calcium, silver, aluminum, gold, copper, iron, nickel, cobalt, platinum, and chromium. While some of these materials yielded results similar to those obtained with barium, none gave any better results. It will be recognized that there is a possibility of two or more different alloys being formed where the bearing surface is formed from an alloy. For example, in employing a bearing material of the type just mentioned, it is possible that the lubricating alloy formed may be a barium-cobalt layer, and since chromium is also present, there may also be a barium-chromium layer.

The lubricating action has also been obtained by vaporizing barium onto 18% chromium, 8% nickel stainless steel bearing surfaces. In one series of tests, a layer of cobalt vaporized on S. A. E. 52-100 steel provided relatively slight lubrication and vaporized barium alone provided very slight lubrication, but just as soon as a barium layer was added on top of the cobalt, excellent lubrication developed. This proves very clearly that at least one lubricating film is a combination of cobalt and barium. In another test, a layer of chromium vaporized on S. A. E. 52-100 steel showed relatively slight lubrication, but as barium was vaporized on top of the chromium, excellent lubrication was obtained even superior to that obtained with cobalt.

A combination layer of aluminum and barium on S. A. E. 52-100 steel balls gave excellent lubrication. In addition, combination layers of manganese and barium, rhodium and barium, and zirconium and barium have been tried with somewhat similar success.

Generally speaking, it has been observed that the best results are obtained with certain elements having similar chemical characteristics when alloyed with thin vaporized films of certain other elements of the alkali and alkaline earth metal groups. Among the elements having similar chemical characteristics which may be mentioned are cobalt, chromium, aluminum, zirconium, rhodium, manganese, iron and nickel. Among the elements which are preferably alloyed with these elements by vaporization are barium, strontium, calcium, and magnesium. For example, barium may be alloyed with any one of the elements mentioned, or with combinations thereof, and the same is true of strontium, calcium, and magnesium. An alloy of chromium and aluminum alone in air also appears to have some lubricating properties when formed as a thin film on the working surface of a bearing, as herein described.

Generally stated, the preferred lubricating alloy combinations of elements for the purpose of this invention are combinations of one or more of the metals of group IIa of the Mendelyeev Periodic System with one or more metals of groups IVa, Va, VIa, VIIa, VIII, Ib, IIb, and/or IIIb, and one or more elements of group VIa with one or more elements of group IIIb.

I have found that bearings treated in accordance with the teachings of my present invention are able to operate substantially without wear and without conventional lubrication throughout extended service periods, under excessive low pressure and high heat conditions. When used in X-ray generators, bearings processed in accordance with my present invention have an extended service life, usually outlasting the normal life of the generator itself.

It is thought that the invention and its numerous attendant advantages will be fully understood from the foregoing description, and it is obvious that numerous changes may be made in the form, construction, and arrangement of the several parts without departing from the spirit and scope of the invention, nor sacrificing its attendant advantages, the forms herein disclosed being merely for the purpose of demonstrating the invention.

The invention is hereby claimed as follows:

1. A method of conditioning an X-ray generator having an X-ray generating element turnably supported by a bearing in an evacuated casing, which comprises vaporizing a lubricating metal in said casing and directing the metal so vaporized upon a working surface of the bearing to form a thin metallic lubricating film thereon.

2. A method of conditioning an X-ray generator having an X-ray generating element turnably supported by a bearing in an evacuated casing, which comprises vaporizing a lubricating metal in said casing, directing the vaporized metal upon at least a portion of a working surface of the bearing to form a thin metallic lubricating film thereon and repeating said vaporization of said metal at intervals in order to renew said lubrication.

3. A method of conditioning an X-ray generator having an X-ray generating element turnably supported by a bearing in an evacuated casing, which consists in applying a lubricating metal thereto in vaporized condition and causing the metal to condense upon surfaces of the bearing.

4. A method of conditioning an X-ray generator having an X-ray generating element turnably supported by a bearing in an evacuated casing, which consists in rotating said bearing while applying to the bearing surface a vaporized lubricating metal and causing said vaporized metal to condense on said bearing surface.

5. A method of conditioning an X-ray generator having an X-ray generating element turnably supported by a bearing in an evacuated casing, which consists in rotating said bearing while applying to a part of the bearing surface a vaporized lubricating metal and causing said vaporized metal to condense on said bearing surface.

6. A method of conditioning an X-ray generator having an X-ray generating element turnably supported by a bearing in an evacuated casing, which comprises vaporizing a lubricating metal in said casing, directing the metal so vaporized upon the working surface of the bearing to form a thin metallic lubricating film thereon, said metal being a readily oxidized metal having a vapor pressure not greater than $10^{-6}$ mm. of mercury at a temperature around 200° C.

7. A method of conditioning an X-ray generator having an X-ray generating element turnably supported by a bearing in an evacuated casing, which comprises vaporizing a lubricating metal in said casing and directing the metal so vaporized upon a working surface of the bearing to form a thin metallic lubricating film thereon, said metal being selected from the metals of group IIa of the periodic system.

8. A method of conditioning an X-ray generator having an X-ray generating element turnably supported by a bearing in an evacuated casing, which comprises vaporizing a lubricating metal in said casing and directing the metal so vaporized upon a working surface of the bearing to form a thin metallic lubricating film thereon, said metal being selected from the metals of group IIIb of the periodic system.

9. A method of preparing and conditioning an X-ray generator having an X-ray generating element turnably supported in bearing means in an evacuated casing, which comprises vaporizing a metal in said casing in the vicinity of said bearing means and condensing the metal so vaporized upon a working surface of the bearing to form a thin metallic lubricating film thereon, said metal being capable of wetting and forming an alloy with the working surface of said bearing.

10. A method of preparing and conditioning an X-ray generator having an X-ray generating element turnably supported in bearing means in an evacuated casing, which comprises forming the working surface of the bearing of a metal containing a metallic element selected from group VIII of the periodic system, vaporizing another metal capable of alloying with said element in the vicinity of said bearing surface and condensing the metal so vaporized upon the working surface of said bearing to form a thin metallic alloy lubricating film thereon.

11. A method of preparing and conditioning an X-ray generator having an X-ray generating element turnably supported in bearing means in an evacuated casing, which comprises forming the working surface of the bearing of a metal containing a metal selected from groups VIa, VIIa, VIII, Ib, IIb and IIIb of the periodic system, vaporizing a metal selected from group IIa of the periodic system in the vicinity of said working surface and condensing the metal so vaporized upon said working surface to form a thin metallic lubricating film thereon.

12. A method as claimed in claim 11 in which the bearing contains cobalt and the vaporized metal comprises barium.

13. A method as claimed in claim 11 in which the bearing contains chromium and the vaporized metal comprises barium.

14. A method as claimed in claim 11 in which the bearing contains aluminum and the vaporized metal comprises barium.

ZED J. ATLEE.